(12) United States Patent
Uhler

(10) Patent No.: US 7,487,332 B2
(45) Date of Patent: Feb. 3, 2009

(54) METHOD AND APPARATUS FOR BINDING SHADOW REGISTERS TO VECTORED INTERRUPTS

(75) Inventor: Michael G. Uhler, Menlo Park, CA (US)

(73) Assignee: Mips Technologies, Inc., Mountain View, CA (US)

( * ) Notice: Subject to any disclaimer, the term of this patent is extended or adjusted under 35 U.S.C. 154(b) by 25 days.

(21) Appl. No.: 11/668,582

(22) Filed: Jan. 30, 2007

(65) Prior Publication Data

US 2007/0124569 A1    May 31, 2007

Related U.S. Application Data

(63) Continuation of application No. 09/977,084, filed on Oct. 12, 2001.

(51) Int. Cl.
*G06F 12/00* (2006.01)
(52) U.S. Cl. .......................................... 712/200; 711/5
(58) Field of Classification Search .................. 712/244, 712/200; 711/5; 703/13, 14, 15
See application file for complete search history.

(56) References Cited

U.S. PATENT DOCUMENTS

| | | | |
|---|---|---|---|
| 4,056,847 A | 11/1977 | Marcantonio | |
| 4,110,822 A | 8/1978 | Porter et al. | |
| 4,217,638 A | 8/1980 | Namimoto et al. | |
| 4,218,739 A | 8/1980 | Negi et al. | |
| 4,296,470 A | 10/1981 | Fairchild et al. | |
| 4,402,042 A | 8/1983 | Guttag | |
| 4,626,985 A | 12/1986 | Briggs | |
| 5,025,368 A | 6/1991 | Watanabe | |
| 5,115,506 A * | 5/1992 | Cohen et al. | 710/267 |
| 5,148,544 A | 9/1992 | Cutler et al. | |
| 5,155,853 A | 10/1992 | Mitsuhira et al. | |
| 5,371,872 A | 12/1994 | Larsen et al. | |
| 5,386,563 A | 1/1995 | Thomas | |
| 5,459,682 A | 10/1995 | Sato | |

(Continued)

OTHER PUBLICATIONS

MCF5206 Coldfire Integrated Microprocessor User's Manual 1997, Motorola.*

(Continued)

*Primary Examiner*—Eric Coleman
(74) *Attorney, Agent, or Firm*—Sterne, Kessler, Goldstein & Fox P.L.L.C.

(57) ABSTRACT

A method and apparatus within a processing system is provided for associating shadow register sets with interrupt routines. The invention includes a vector generator that receives interrupts, and generates exception vectors to call interrupt routines that correspond to the interrupts. The exception vector considers the type of interrupt and the priority level of the interrupt when selecting the exception vector. Shadow set mapping logic is coupled to the vector generator. The mapping logic contains a number of fields that correspond to the different exception vectors that may be generated. The fields are programmable by kernel mode instructions, and contain data mapping each field to one of a number of shadow register sets. When an interrupt occurs, the vector generator generates a corresponding exception vector. In addition, the shadow set mapping logic looks at the field corresponding to the exception vector, and retrieves the data stored therein. The data is used to switch to one of the shadow register sets for use by an interrupt routine. Upon return from the interrupt routine, the previously used register set is selected.

30 Claims, 13 Drawing Sheets

U.S. PATENT DOCUMENTS

| | | | |
|---|---|---|---|
| 5,481,719 A * | 1/1996 | Ackerman et al. | 718/108 |
| 5,481,725 A | 1/1996 | Jayakumar et al. | |
| 5,594,905 A | 1/1997 | Mital | |
| 5,603,035 A | 2/1997 | Erramoun et al. | |
| 5,613,151 A | 3/1997 | Dockser | |
| 5,615,348 A | 3/1997 | Koino et al. | |
| 5,664,200 A | 9/1997 | Barlow et al. | |
| 5,682,546 A * | 10/1997 | Garg et al. | 712/23 |
| 5,701,493 A | 12/1997 | Jagger | |
| 5,758,096 A | 5/1998 | Barsky et al. | |
| 5,758,112 A | 5/1998 | Yeager et al. | |
| 5,768,500 A | 6/1998 | Agrawal et al. | |
| 5,797,036 A | 8/1998 | Kikinis | |
| 5,822,595 A | 10/1998 | Hu | |
| 5,940,587 A | 8/1999 | Zimmer | |
| 6,081,867 A * | 6/2000 | Cox | 710/264 |
| 6,094,730 A * | 7/2000 | Lopez et al. | 714/28 |
| 6,148,321 A | 11/2000 | Hammond | |
| 6,154,832 A * | 11/2000 | Maupin | 712/228 |
| 6,178,482 B1 * | 1/2001 | Sollars | 711/129 |
| 6,223,279 B1 | 4/2001 | Nishimura et al. | |
| 6,243,804 B1 * | 6/2001 | Cheng | 712/228 |
| 6,332,181 B1 | 12/2001 | Bossen et al. | |
| 6,470,435 B2 | 10/2002 | Samra et al. | |
| 6,477,562 B2 | 11/2002 | Nemirovsky et al. | |
| 6,499,078 B1 | 12/2002 | Beckert et al. | |
| 6,539,448 B1 | 3/2003 | Deng | |
| 6,574,693 B1 * | 6/2003 | Alasti et al. | 710/262 |
| 6,651,126 B1 * | 11/2003 | Cantrell et al. | 710/264 |
| 6,778,506 B1 | 8/2004 | McDonnell et al. | |
| 7,020,879 B1 | 3/2006 | Nemirovsky et al. | |
| 2002/0018486 A1 | 2/2002 | Musoll et al. | |
| 2003/0023799 A1 | 1/2003 | Yoo et al. | |
| 2003/0074508 A1 * | 4/2003 | Uhler | 710/260 |
| 2003/0074545 A1 * | 4/2003 | Uhler | 712/228 |
| 2003/0088723 A1 | 5/2003 | Mackey et al. | |

OTHER PUBLICATIONS

U.S. Appl. No. 09/561,510, Galinas et al.

"MCF5206 Integrated Microprocesor." Product Brief. Motorola Communication and Advanced Consumer Technologies Group. Freescale Semiconductor, Inc. 1996. MCF5206/D.

"Addendum to MCF5206 User Manual." Revision .0.1. Motorola Consumer Systems Group. Freescale Semiconductor, Inc. Apr. 13, 1998. MCF5206UMAD/AD.

Singhal, Ashok et al. "Implementing a Prolog Machine with Multiple Functional Units." 1988 IEEE. pp. 41-56.

Mano, M. Morris. "Computer System Architecture." Prentice Hall. 2ed. pp. 434-443.

Brylow, Dennis et al. "Static Checking of Interrupt-driven Software." 2001. IEEE. pp. 47-56.

"MIPS32 4K Processor Core Family Software User's Manual." Revision 1.12. Jan. 3, 2001. MIPS Technologies, Inc. Document No. MD00016. Chapter 5. pp. 69-106.

"MIPS64 5K Processor Core Family Software User's Manual." Revision 02.08. May 28, 2002. MIPS Technologies, Inc. Document No. MD00012. Chapter 5. pp. 103-140.

Singhal, Ashok et al. "Implementing a Prolog Machine with Multiple Functional Units." 1988 IEEE. pp. 41-49.

* cited by examiner

Flow Chart for Prior Art Interrupt Handling

Figure 4

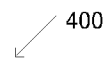

General Purpose Registers

| Register Number | Name  | Used For                                                                                                                                                        |
|-----------------|-------|------------------------------------------------------------------------------------------------------------------------------------------------------------------|
| 0               | zero  | Always returns 0                                                                                                                                                |
| 1               | at    | (assembler temporary) Reserved for use by assembler                                                                                                             |
| 2-3             | v0,v1 | Value returned by subroutine                                                                                                                                    |
| 4-7             | a0-a3 | (arguments) First few parameters in a subroutine                                                                                                                |
| 8-15            | t0-t7 | (temporaries) Subroutines can use without saving                                                                                                                |
| 24,25           | t8,t9 |                                                                                                                                                                 |
| 16-23           | a0-a7 | Subroutine register variables; a subroutine that writes one of these must save the old value and restore it before it exits, so the calling routine sees the values preserved |
| 26,27           | k0,k1 | Reserved for use by interrupt/trap handler                                                                                                                      |
| 28              | gp    | Global pointer                                                                                                                                                  |
| 29              | sp    | Stack pointer                                                                                                                                                   |
| 30              | s8/fp | Ninth register variable; subroutines that need one can use this as a frame pointer                                                                              |
| 31              | ra    | Return address for subroutine                                                                                                                                   |

Status Register Format - Status1

SRSLo Register Format

SRSHi Register Format

Status1 Register Field Descriptions

| Fields | | Description | Read/ |
|---|---|---|---|
| Name | Bits | | Write |
| 0 | 31..204 15..14, 5 | Must be written as zero; returns zero on read | 0 |
| PSS | 23..20 | Previous Shadow Set. If GPR shadow registers are implemented, this field is copied from the CSS field when an exception or interrupt occurs and provides the value of CSS. An eret instruction copies this value back into the CSS field.<br><br>If no GPR shadow registers are implemented, this field is ignored on writes and returns zero on read. | R/W |
| CSS | 19..16 | Current Shadow Set. If GPR shadow registers are implemented, this field is the number of the current GPR set.<br><br>If no GPR shadow registers are implemented, this field is ignored on write and returns zero on read. | R/W |
| IM[13:8] | 13..8 | Interrupt Mask: Controls the enabling of the IP[13:8] interrupts.<br><br>| Encoding | Meaning |<br>\|---\|---\|<br>\| 0 \| Interrupt request disabled \|<br>\| 1 \| Interrupt request enabled \| | R/W |
| TE | 7 | Timer Exclusive. This bit determines whether the timer interrupt is combined in an implementation dependent way with hardware interrupt 5 to become IP5 (default) or redirected to IP12.<br><br>| Encoding | Meaning |<br>\|---\|---\|<br>\| 0 \| Timer interrupt combined as IP5 \|<br>\| 1 \| Timer interrupt redirected to IP12 \| | R/W |

Figure 6b

Status1 Register Field Descriptions, cont.

| Fields | | Description | Read/Write |
|---|---|---|---|
| Name | Bits | | |
| PE | 6 | Performance Counter Exclusive. This bit determines whether the performance counter interrupt is combined in an implementation dependent way with hardware interrupt 5 to become IP5 (default) or redirected to IP13.<br><br>{{table}} | R/W |
| VS | 4..0 | Vector Spacing. This field specifies the spacing between vectored interrupts and exceptions.<br><br>{{table2}} | R/W |

PE encoding table:

| Encoding | Meaning |
|---|---|
| 0 | Timer interrupt combined as IP5 |
| 1 | Timer interrupt redirected to IP13 |

VS encoding table:

| Encoding | Spacing Between Vectors (decimal) |
|---|---|
| 16#00 | 0 |
| 16#01 | 32 |
| 16#02 | 64 |
| 16#04 | 128 |
| 16#08 | 256 |
| 16#10 | 512 |
| All other values are reserved. | |

SRSLo Register Field Descriptions

| Fields | | Description | Read/ Write |
|---|---|---|---|
| Name | Bits | | |
| EVL7 | 31..28 | Shadow register set number for Exception Vector Level 7 | R/W |
| EVL6 | 27..24 | Shadow register set number for Exception Vector Level 6 | R/W |
| EVL5 | 23..20 | Shadow register set number for Exception Vector Level 5 | R/W |
| EVL4 | 19..16 | Shadow register set number for Exception Vector Level 4 | R/W |
| EVL3 | 15..12 | Shadow register set number for Exception Vector Level 3 | R/W |
| EVL2 | 11..8 | Shadow register set number for Exception Vector Level 2 | R/W |
| EVL1 | 7..4 | Shadow register set number for Exception Vector Level 1 | R/W |
| EVL0 | 3..0 | Shadow register set number for Exception Vector Level 0 | R/W |

Figure 10

SRSHi Register Field Descriptions

| Fields | | Description | Read/ |
|---|---|---|---|
| Name | Bits | | Write |
| 0 | 31..28 | Must be written as zero; returns zero when read | R/W |
| EM | 27..24 | Shadow register set number for non-vectored Exception Mode ($Status_{EXL}=1$). This value is used only if an interrupt is not serviced thru the vectored exception table. | R/W |
| EVL13 | 23..20 | Shadow register set number for Exception Vector Level 13 | R/W |
| EVL12 | 19..16 | Shadow register set number for Exception Vector Level 12 | R/W |
| EVL11 | 15..12 | Shadow register set number for Exception Vector Level 11 | R/W |
| EVL10 | 11..8 | Shadow register set number for Exception Vector Level 10 | R/W |
| EVL9 | 7..4 | Shadow register set number for Exception Vector Level 9 | R/W |
| EVL8 | 3..0 | Shadow register set number for Exception Vector Level 8 | R/W |

Figure 13

Read Shadow GPR Instruction - RDSGPR

| 31 26 | 25 | 24 21 | 20 16 | 15 11 | 10 6 | 5 0 |
|---|---|---|---|---|---|---|
| COP0 010000 | C0 1 | 0 0000 | rt | rd | offset | RDSGPR 101000 |
| 6 | 1 | 4 | 5 | 5 | 5 | 6 |

Format: RDSGPR rt, offset(rd)

Purpose:
To move the contents of a shadow GPR register to a current GPR.

Description: rt ← SGPR [rd + offset]
The contents of the shadow GPR register specified by the sum of offset and rd is moved to the current GPR rt.

Restrictions:
The results are UNDEFINED if the sum of offset and rd do not reference an implemented shadow register.

Operation:
    if IsCoprocessorEnabled(0) then
        if (ArchitectureRevision>=2) then
            GPR[rt] ← SGPR[rd = offset]
        else
            SignalException(ReservedInstruction)
        endif
    else
        SignalException(CoprocessorUnusable, 0)
    endif

Exceptions:
Coprocessor Unusuable
Reserved Instruction

Write Shadow GPR Instruction - WRSGPR

| 31    26 | 25 | 24   21 | 20   16 | 15   11 | 10   6 | 5    0 |
|----------|----|---------|---------|---------|--------|--------|
| COP0 010000 | C0 1 | 0 0000 | rt | rd | offset | WRSGPR 101100 |
| 6 | 1 | 4 | 5 | 5 | 5 | 6 |

Format: WRSGPR rt, offset(rd)

Purpose:
To move the contents of a current GPR to a shadow GPR.

Description: SGPR [rd + offset]←rt
The contents of the current GPR rt is moved to the shadow GPR register specified by the sum of offset and rd.

Restrictions:
The results are UNDEFINED if the sum of offset and rd do not reference an implemented shadow register.

Operation:
```
if IsCoprocessorEnabled(0) then
        if (ArchitectureRevision>=2) then
                SGPR[rd = offset]  ←  GPR[rt]
        else
                SignalException(ReservedInstruction)
        endif
    else
        SignalException(CoprocessorUnusable, 0)
    endif
```

Exceptions:
Coprocessor Unusuable
Reserved Instruction

METHOD AND APPARATUS FOR BINDING SHADOW REGISTERS TO VECTORED INTERRUPTS

CROSS-REFERENCE TO RELATED APPLICATIONS

This application is a continuation of U.S. patent application Ser. No. 09/977,084, filed Oct. 12, 2001, which is related to U.S. patent application Ser. No. 09/977,089, filed Oct. 21, 2001, entitled "CONFIGURABLE PRIORITIZATION OF CORE GENERATED INTERRUPTS", assigned to MIPS Technologies, Inc.

FIELD OF THE INVENTION

This invention relates in general to the field of computer architecture, and more specifically to a method and apparatus for allowing binding of shadow register sets to particular interrupt vectors.

BACKGROUND OF THE INVENTION

Within a computer processing environment, an interrupt, as the name implies, is some event which interrupts normal program execution. That is, programs execute on a microprocessor sequentially, being altered only by those instructions which expressly cause program flow to deviate in some way (e.g., jump instructions, branch instructions, etc.) Interrupts, on the other hand, give system designers a mechanism to "put on hold" normal program flow, for the purpose of executing a special program called an interrupt handler, and then allows the processor to resume normal program flow as if it had never been interrupted. The interrupt handler is only executed when a certain event (interrupt) occurs. The event may be a timer overflowing, or a serial port transmitting a character. By providing the ability to interrupt normal program execution, certain events such as those mentioned above are much easier and more efficient to handle than requiring the microprocessor to periodically execute special programs.

Referring to FIG. 1, a block diagram is provided that will help illustrate how interrupts are handled within a prior art processing environment. The environment 100 includes a microprocessor 102, coupled to an interrupt controller 110 and memory 120. The microprocessor contains a core 104 for executing instructions retrieved from the memory 120. In addition, the core 104 produces a number of interrupts 106, including both software interrupts and hardware interrupts (e.g., timer overflow) that must be "handled" by the microprocessor 102, as will be further described below with reference to FIG. 2. The microprocessor 102 further includes a cause register 108 for indicating to the microprocessor 102 the cause or source of an interrupt.

The interrupt controller 110 is coupled to a number of external devices 118 via interrupt lines 116, and to other system interrupts 114. The interrupt controller 110, orders the interrupts 110 to provide them to the microprocessor 102 via interrupt lines 112. One skilled in the art will appreciate that early microprocessors 102 were provided with a preset number of interrupt lines 112 for use by system level designers. However, as the need for interrupts increased, rather than adding additional pins on the microprocessor, interrupt controllers 110 were provided to interface between the increased number of interrupts 114, 116, and the existing interrupt lines 112 on the microprocessor 102.

The microprocessor 102 is connected to the memory 120, to retrieve instructions for execution, as mentioned above, to retrieve information relating to interrupts, such as an interrupt vector table 122, and to retrieve the programs which handle the interrupts 124.

Referring now to FIG. 2, a flow chart 200 is shown that illustrates prior art program flow when an interrupt occurs within the microprocessor 102. Operation of the program flow for handling interrupts will now be described with reference to both FIGS. 1 and 2.

Program execution begins at block 202 and proceeds to block 204.

At block 204, instructions are executed by the microprocessor 102 that are retrieved from memory 120. Flow then proceeds to decision block 206.

At decision block 206, a determination is made by the microprocessor 102 as to whether an interrupt has occurred, either by the core 104, or by the interrupt lines 112. Although not shown, the microprocessor 102 includes logic that detects and latches an interrupt when it occurs, thereby alerting the microprocessor 102 of the interrupt. The state of the latches is typically checked by the microprocessor 102 between every instruction execution. If no interrupt has occurred, flow proceeds back to block 204 where the microprocessor 102 continues to execute instructions. However, if an interrupt occurs, flow proceeds to block 208.

At block 208, the microprocessor 102 ceases execution of the current program instructions, and saves its current state information. This allows the microprocessor 102 to return to its present state after responding to the interrupt. One skilled in the art will appreciate that such state information includes the value in the program counter, the values in the status register, various pointers, etc. Flow then proceeds to block 210.

At block 210, the microprocessor 102 jumps to a special program called an interrupt handler (or exception handler), such as interrupt handler #1 124. Flow then proceeds to block 212.

At block 212, the contents of the general purpose register file (GPR) is saved. That is, in every microprocessor, the GPR provides register space where data is stored, examined, manipulated, etc. Before beginning processing of an interrupt, the GPR must be saved so that the interrupt handler can utilize the register space. This may include only certain registers within the GPR, or all the registers in the GPR. Flow then proceeds to block 214.

At block 214, the interrupt is handled by the particular interrupt handler routine 124 that was jumped to. Flow then proceeds to block 216.

At block 216, the contents of the GPR are restored so that the GPR is in the state that it was in prior to the microprocessor 102 taking the interrupt. Flow then proceeds to block 218.

At block 218, the interrupt handler 124 returns program flow back to block 204 to continue execution of the program that was executing when the interrupt occurred. As part of the return step, the state of the microprocessor is restored.

One skilled in the art will appreciate that the above description of the microprocessor system 100, and the interrupt handling flow chart 200 is very general. That is, the description has ignored more complex aspects of interrupt handling, such as what occurs when multiple interrupts occur at the same time, or when an interrupt occurs during handling of another interrupt, or how multiple interrupts are prioritized, etc. However, the above is sufficient to illustrate that when interrupts occur, normal program flow is stopped, the state of the microprocessor is stored, and the contents of resources within the microprocessor, including the GPR, must be saved away, before handling the interrupt.

For interrupts that do not require immediate processing, the time required to save away the contents of the GPR, such as that described above with reference to block 212, is not critical. Thus, if it takes 20-50 clock cycles, for example, to store away the contents of the GPR, before retrieving data from a floppy disk controller, the delay relating to determining the type of interrupt is inconsequential.

However, in many instances the delay associated with saving away the contents of the GPR (as illustrated in FIG. 2) is unacceptable.

Therefore, what is needed is a mechanism that allows a system designer to handle high priority interrupts, without first having to store away the contents of the GPR.

Moreover, what is needed is a method and apparatus that provides shadow registers for the GPR, to be used for handling interrupts and exceptions.

In addition, what is needed is a method and apparatus for binding particular shadow register sets to particular interrupts, or interrupt vectors, so that particular interrupt routines can "effectively" have their own register set.

And, what is needed is a method and apparatus that allows high priority interrupts to begin utilizing their own dedicated resources as soon as possible, rather than having to wait for system resources to first be saved away.

SUMMARY

The present invention provides a method and apparatus for allowing a system designer to programmably bind shadow register sets to particular interrupts, based either on interrupt priority level, or the exception vector that is used to call the interrupt routine.

In one aspect, the present invention provides a processing system that includes a number of shadow register sets, an interrupt vector generator, for generating an exception vector associating with an interrupt handler, when the processing system receives an interrupt; and shadow set mapping logic, coupled to both the shadow register sets, and the interrupt vector generator, for selecting one of the shadow register sets to be used by the interrupt handler.

In another aspect, the present invention provides a microprocessor for receiving interrupts, and for executing interrupt routines corresponding to the interrupts. The microprocessor includes: a general purpose register set, having a registers that are addressable by instructions; shadow register sets, each having registers that are addressable by the instructions; and shadow set mapping logic, to select one of the shadow register sets to be addressable by the instructions upon receipt of interrupts.

In a further aspect, the present invention provides register set selection logic within a microprocessor. The microprocessor receives interrupts that are serviced by corresponding interrupt routines. The selection logic includes: register sets, each having registers, wherein a first one of the register sets is directly addressable by instructions; a vector generator, to receive the interrupts, and to generate exception vectors, each relating to one of the interrupt routines; and mapping logic, to select ones of the register sets for use by the interrupt routines; wherein the mapping logic selects ones of the register sets by utilizing the exception vectors.

In another aspect, the present invention provides a microprocessor with a first register set for use by non-interrupt instructions, and second and third register sets for use by interrupt service routines. The microprocessor includes: a vector generator, to generate exception vectors corresponding to the interrupt service routines; and mapping logic, to select between the second and third register sets for use by the interrupt service routines, based on a value of the exception vectors.

In a further aspect, the present invention provides a method within a processing system for utilizing shadow register sets for exception routines. The method includes: upon receipt of an interrupt, determining which one of a plurality of exception routines should be executed; and based on the received interrupt, selecting one of a plurality of shadow register sets to be utilized by the one of the plurality of exception routines; wherein said step of selecting utilizes programmable registers that contain data indicating which one of the plurality of shadow register sets is to be used for its register.

In another aspect, the present invention provides a computer program product for use with a computing device, the computer program product including a computer usable medium, having computer readable program code embodied in the medium, for causing a microprocessor to be described. The computer readable program code includes: first program code for providing shadow register sets; and second program code for providing programmable shadow set mapping logic for selecting shadow register sets to be utilized by interrupt routines addressed by exception vectors; wherein the mapping logic contains programmable fields that correspond to the exception vectors.

In a further aspect, the present invention provides a computer data signal embodied in a transmission medium that includes computer-readable program code for providing a microprocessor having a general purpose register set, and a plurality of shadow register sets. The program code includes: first program code for providing a vector generator, for receiving interrupts and for generating exception vectors corresponding to each of the received interrupts; second program code for providing mapping logic, the mapping logic having a plurality of fields, each of the plurality of fields corresponding to one of the generated exception vectors; and third program code for providing shadow register selection logic, for reading the contents of the field corresponding to a generated one of the exception vectors, and selecting one of the plurality of shadow register sets based on the contents of the field.

Other features and advantages of the present invention will become apparent upon study of the remaining portions of the specification and drawings.

BRIEF DESCRIPTION OF THE DRAWINGS

FIG. 4 is a table illustrating the GPR for a MIPS® Architecture Microprocessor.

FIGS. 6a-b are a table describing the status register shown in FIG. 5.

FIG. 8 is a table describing the fields within the shadow register map register of FIG. 7.

FIG. 10 is a table describing the fields within the shadow register map register of FIG. 9.

FIG. 13 is a block diagram describing an instruction to read the contents of a register in a shadow register into a current register set.

FIG. 14 is a block diagram describing an instruction to write the contents of a current register into a shadow register set.

DETAILED DESCRIPTION

The issue of establishing processor resources for use in interrupt handling is ubiquitous throughout microprocessor architectures. However, to allow the reader to better appreciate the novel solution to the above described problems, the solution will be described with particular reference to MIPS® processors, developed by MIPS Technologies, Inc. of Mountain View Calif. (see www.mips.com).

Figure 1:
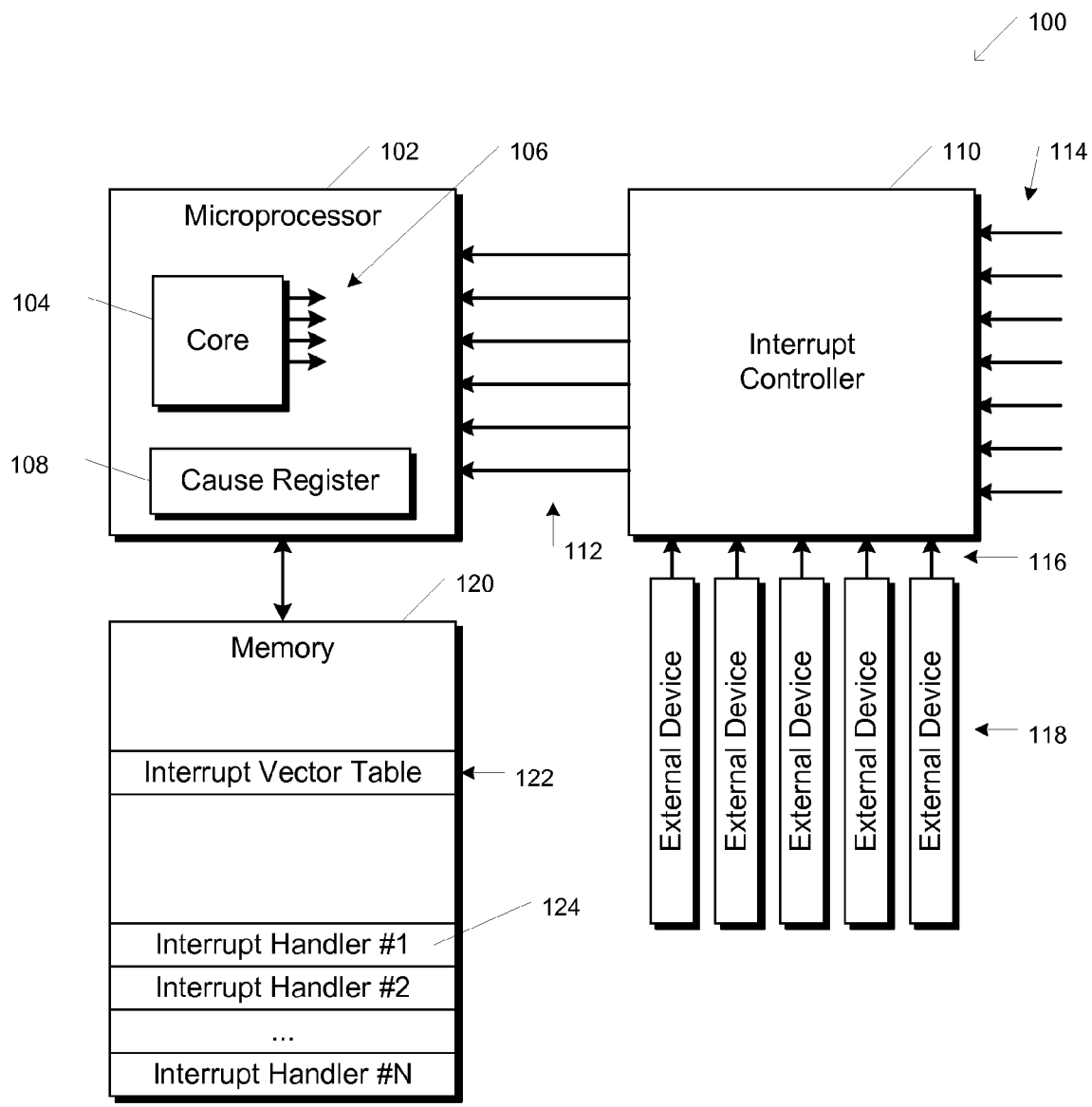
FIG. 1 is block diagram of a prior art microprocessor environment.
Figure 2:
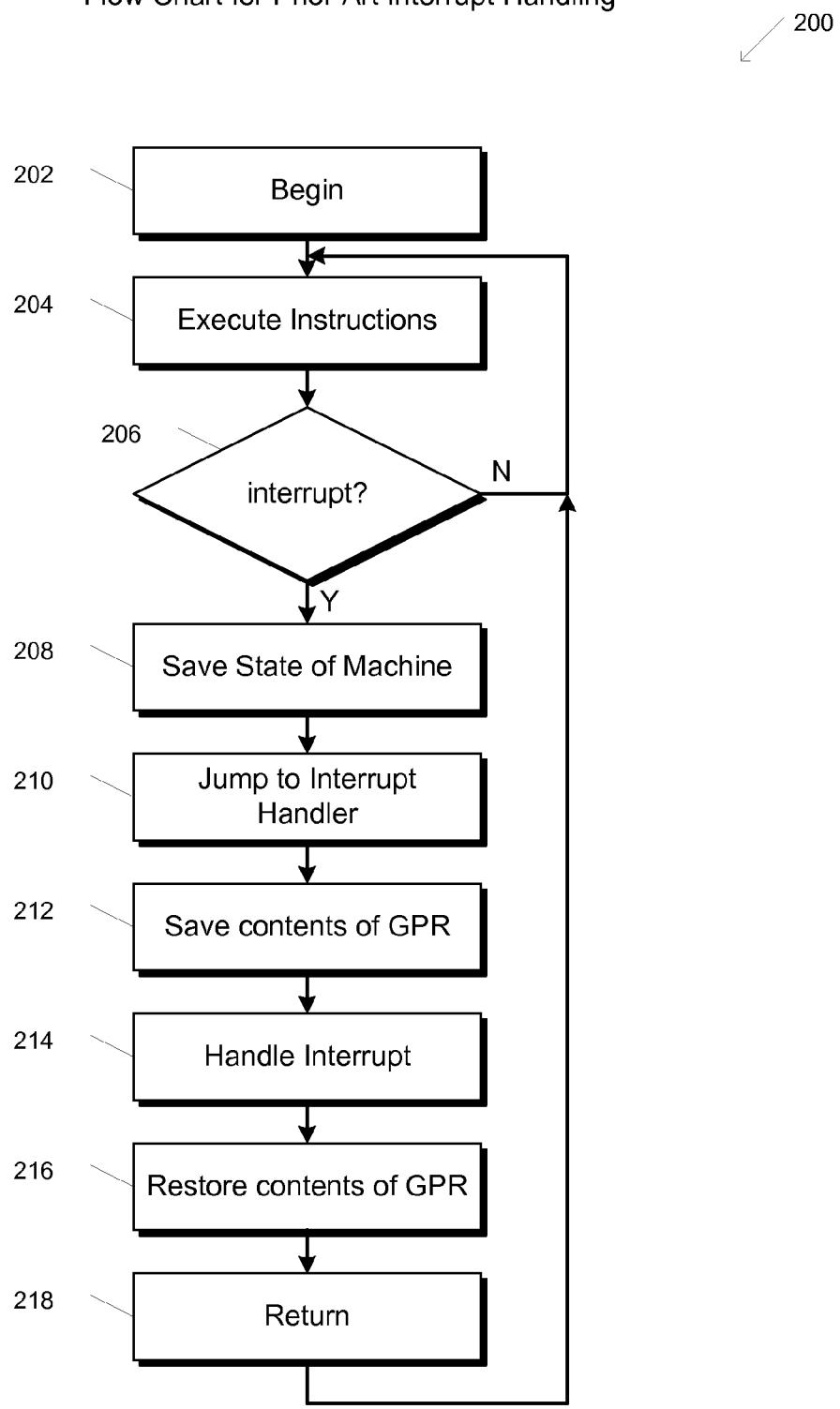
FIG. 2 is a flow chart of a prior art method of handling interrupts.
Figure 3:
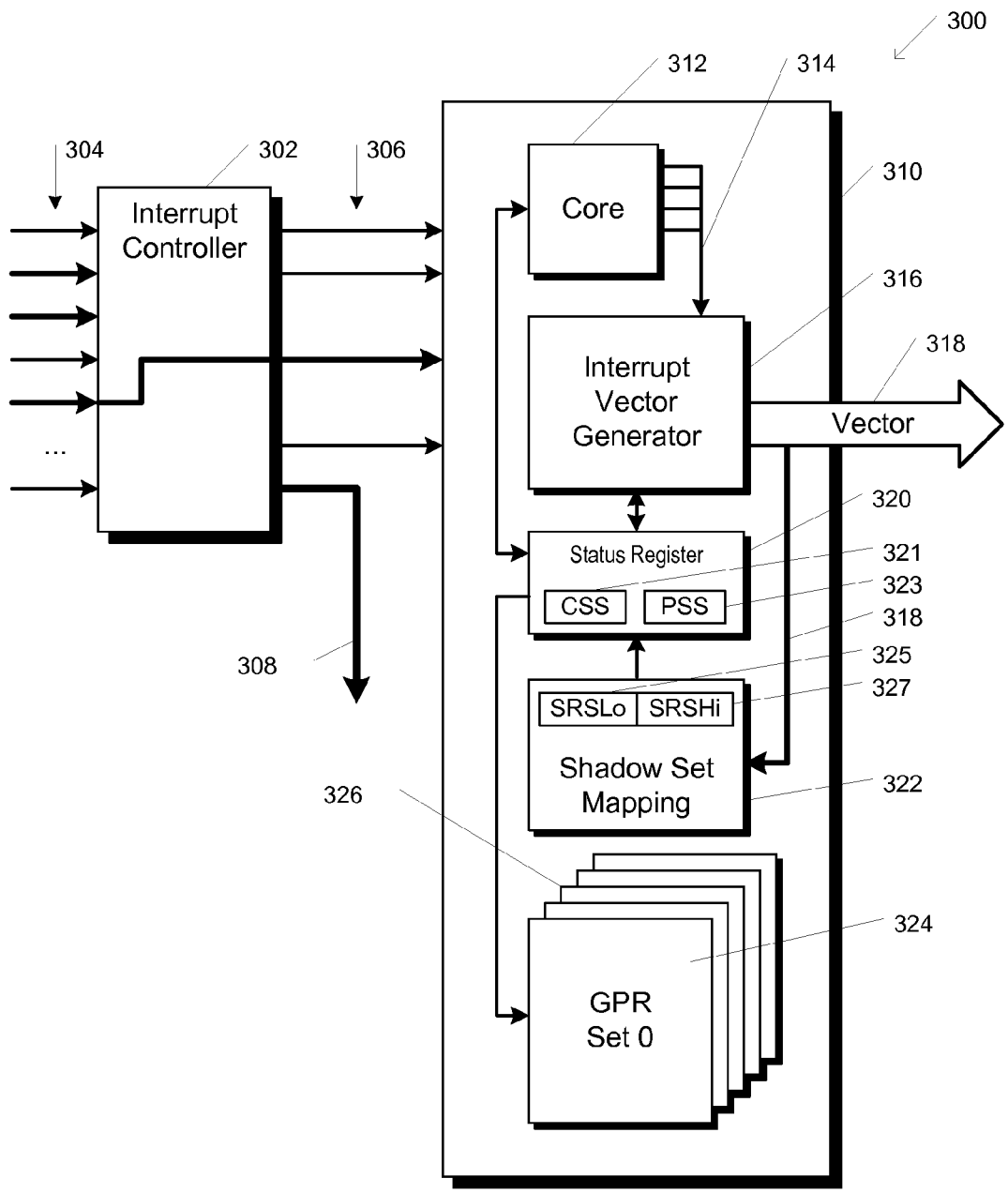
FIG. 3 is a block diagram of a microprocessor according to the present invention.

Referring now to FIG. 3, a block diagram is shown of a microprocessor based system 300 according to the present invention. The system 300 includes a microprocessor 310 coupled to an interrupt controller 302. One skilled in the art will appreciate that the microprocessor 310 and the interrupt controller 302 could physically reside on separate chips, or alternatively, could reside on the same piece of silicon in a system on a chip (SOC). The interrupt controller 302 is attached to a number of system interrupt lines 304. In one embodiment, there are sixteen interrupt lines 304 provided in the system 300, although additional interrupt lines can easily be accommodated by cascading multiple interrupt controller's 302. The interrupt controller 302 prioritizes all of its interrupts 304, and passes its interrupt requests to the processor 302 on the processor's 302 interrupt lines 306. In one embodiment, the processor 310 provides for eight interrupt lines 306. In addition, the interrupt controller passes the interrupt requests 304 to other processor cores (not shown) on interrupt bus 308.

Within the microprocessor 310 are a core 312, an interrupt vector generator 316, a status register 320, shadow set mapping logic 322 a general purpose register set 324 having individual registers (described below in FIG. 4) that are addressable by instructions, and a number of shadow register sets 326. In one embodiment, the shadow register sets 326 are substitutes for the normal GPR 324 that can be used in certain processor modes of operation, including Kernel Mode, and Exception Mode, or in response to a vectored interrupt or exception. Once a shadow register set 326 is bound to a particular mode, reference to addressable registers in the GPR 324 (by operands) work exactly as one would expect, but they go to registers that are dedicated to that mode.

The core 312 is responsible for executing instructions provided to the microprocessor 310 by a memory (not shown). In addition, the core 312 generates a number of core specific interrupts 314 (or internally generated interrupts), as will be further described below, to the vector generator 316. The vector generator 316 also receives the interrupts 306 provided by the interrupt controller 302 (e.g., externally generated interrupts). The vector generator 316 merges the prioritized interrupts 306 with the interrupts 314 generated by the core 312, and generates an interrupt vector 318 corresponding to the highest priority interrupt, as determined by the vector generator 316. A complete description of how the vector generator 316 prioritizes on-core and off-core interrupts, and generates an interrupt vector, is described in co-pending U.S. patent application Ser. No. 09/977,089, entitled "CONFIGURABLE PRIORITIZATION OF CORE GENERATED INTERRUPTS" which is hereby incorporated by reference for all purposes.

The Status Register 320 contains a Current Shadow Set (CSS) register 321 and a Previous Shadow Set (PSS) register 323. The shadow set mapping 322 also contains two registers: a SRSLo register 325, and an SRSHi register 327. All four of these registers will be further described below. However, to provide a context for the following discussion, a brief overview of the invention will now be provided with respect to FIG. 3.

As mentioned in the Background, there is a need to reduce or eliminate the time required to save and restore the GPR 324 on entry to high priority interrupts or exceptions. In addition, there is a need to provide specified processor modes with the same capability. This is done by introducing a number of shadow register sets 326 that duplicate some or all of the information in the GPR 324. The shadow sets 326 are bound to a processor mode, or to an interrupt or exception vector by kernel mode software. The number of shadow sets 326 is implementation dependent, but in one embodiment may range from one to fifteen.

Operationally, when an interrupt (e.g., on lines 306 or 314 or exception occurs, the vector generator 316 selects an exception vector 318, causing the microprocessor 310 to jump to the exception handler program beginning at the memory address defined by the exception vector 318. In addition, the vector 318 is provided to the shadow set mapping logic 322. The mapping logic 322 selects one of the shadow sets 326 (as will be further described below) to be used during the exception, and provides an indication of the selected shadow set 326 to the status register 320. The contents of the CSS 321 are changed to reflect the newly selected shadow set 326, and the previous contents of CSS are placed in the PSS 323. When the microprocessor 310 begins executing the exception handler, rather than utilizing the GPR 324 for data manipulation, it will use one of the shadow sets 326, as selected by the shadow set mapping logic 322. Upon return from the exception handler, the contents of PSS 323 are placed in CSS 321 so that program execution will continue using the GPR 324. Thus, the exception handler is able to immediately begin utilizing a register set, without first having to copy the contents of the GPR 324 to memory. In addition, the exception handler completes its task faster, since at its end, it does not have to restore the contents of the GPR 324.

Referring now to FIG. 4, a table 400 is provided that details the thirty-two registers within the GPR 324. These registers are the architecturally provided registers within the MIPS Architecture. They are detailed to indicate a particular implementation of the present invention. However, one skilled in the art will appreciate that the present invention is not limited to the specific register arrangement of the MIPS Architecture.

In one embodiment, all thirty-two registers shown in table 400 are duplicated in each of the shadow register sets 326. Such an embodiment provides for manufacturing simplicity. Alternatively, another embodiment only duplicates certain ones of the thirty-two registers of the GPR 324 to conserve chip area. In this embodiment, registers 1 (at), 2-3 (v0-v1), 4-7 (a0-a3), 8-15 (t0-t7), 26-27 (k0-k1), 28 (gp), 29 (sp) and 31 (ra) are recommended for duplication.

Figure 5:
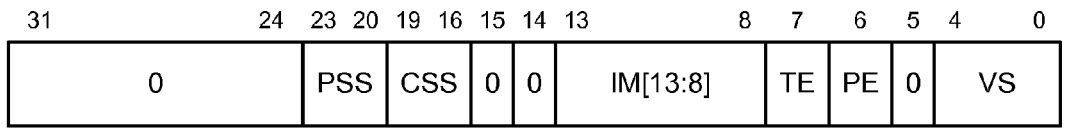
FIG. 5 is a block diagram of a status register within a microprocessor according to the present invention.

Referring now to FIG. 5, a block diagram 500 is provided illustrating the format of the status register 320. Within the MIPS Architecture, there is a status register SR within the COP0 interface. The status register 320 is distinct from the SR, and is termed the Status1 register within the MIPS Version 2.0 Architecture Extensions. The Status1 Register 320 contains 10 fields, including the PSS field 323 and the CSS field 321 whose operation will be further described below with reference to FIG. 11.

Referring now to FIGS. 6a-b, a table 600 is shown that provides a detailed description of each of the fields within the Status1 register 320. Again, of particular interest to the present invention are fields PSS 323 and CSS 321.

Figure 7:
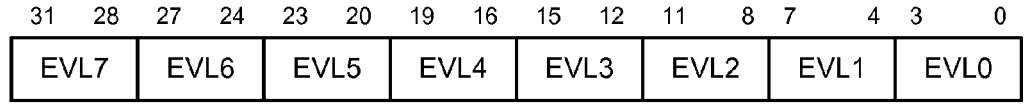
FIG. 7 is a block diagram of a first shadow register map register, according to the present invention.

Referring now to FIG. 7, a block diagram 700 is shown illustrating the fields within the SRSLo register 325. In one embodiment, the SRSLo register 325 is a thirty-two bit register having eight four-bit fields. Each of the eight four-bit fields corresponds to one of eight possible exception vectors produced by the vector generator 316. In an alternative embodiment, the eight four-bit fields correspond to interrupt (or exception) priority levels, also indicated by the vector generator 316.

Referring now to FIG. 8, a table 800 is shown that describes the eight four-bit fields within the SRSLo register 325. To better illustrate use of the eight four-bit fields, assume that there are sixteen register sets, including the GPR 324 and fifteen shadow sets 326, and that they are identified as sets 0-15. Then, for the eight possible exception vector levels (covered within SRSLo) produced by the vector generator 316, a designer can either utilize eight different shadow sets, arranged in any order, or can group the exception vector levels to utilize the same shadow set. For example, if only three shadow sets 326 are available (designated as 1, 2, and 3), then a designer could programmably store the values of (0001, 0010, and 0011) in any of the eight four-bit fields to designate the desired shadow set 326 to be used for the corresponding exception vector level.

| Name | Exception Vector Level | Bit Value |
|------|------------------------|-----------|
| EVL7 | 7 | 0001 |
| EVL6 | 6 | 0010 |
| EVL5 | 5 | 0011 |
| EVL4 | 4 | 0011 |
| EVL3 | 3 | 0001 |
| EVL2 | 2 | 0010 |
| EVL1 | 1 | 0001 |
| EVL0 | 0 | 0011 |

Thus, for exception vector levels 1, 3 and 7, shadow set 1 will used, for levels 2 and 6, shadow set 2 will be used, and for levels 0, 4 and 5, shadow set 3 will be used. In one embodiment, the SRSLo register 325 can be programmed utilizing a kernel mode instruction. Alternatively, the values within the SRSLo register can be provided for in hardware, either statically, or configured by hardware external to the microprocessor 310.

Figure 9:
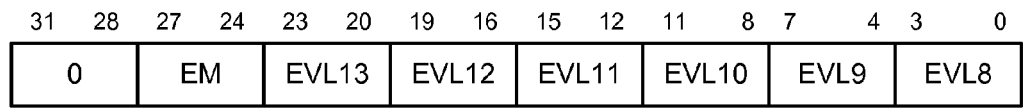
FIG. 9 is a block diagram of a second shadow register map register, according to the present invention.

Referring now to FIG. 9, a block diagram 900 is shown illustrating eight four-bit fields within the SRSHi register 327. A description of each of these eight four-bit fields is provided in table 1000 shown in FIG. 10, to which attention is now directed. More specifically, bits 0-23 define shadow sets for an additional six exception vector levels. In addition, a shadow set may also be defined for a non-vectored exception mode using field EM (bits 24 . . . 27). Thus, in one embodiment, the combination of both the SRSLo and SRSHi registers 325, 327 provide for mapping of fourteen different exception vector levels, to sixteen distinct shadow sets.

Figure 11:
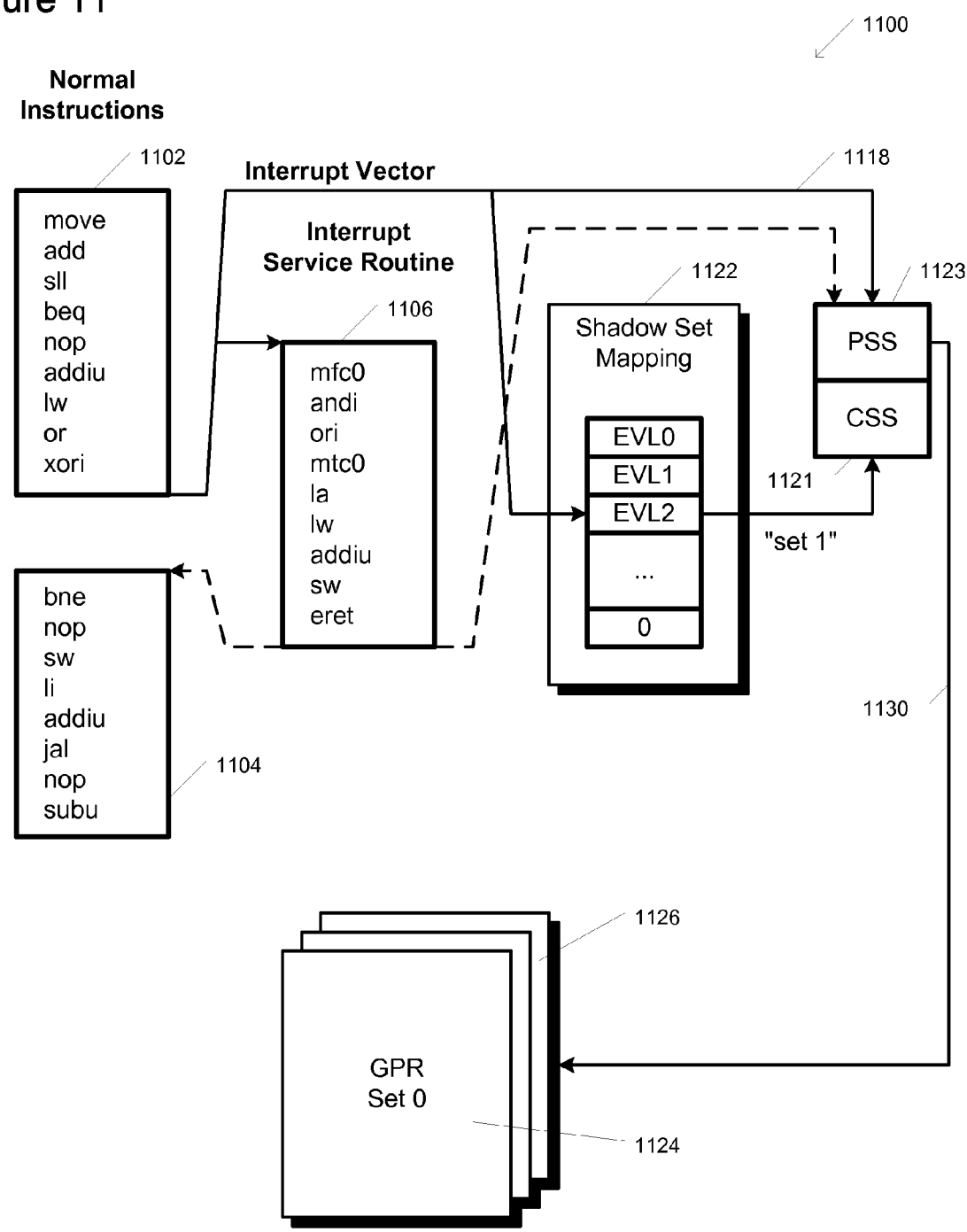
FIG. 11 is a block diagram illustrating selection of a shadow register set using the interrupt vector produced when an interrupt occurs, according to the present invention.

Referring now to FIG. 11, a block diagram 1100 is shown illustrating operation of the microprocessor 300 when it receives an interrupt. More specifically, a set of normal (i.e., non-interrupt) instructions 1102 are executing on the microprocessor 310 when an interrupt occurs. The vector generator 316 determines the priority (or the cause) of the interrupt, and generates a vector 318 (1118 in FIG. 11) corresponding to the interrupt. The vector 1118 is provided to memory (not shown) to retrieve an interrupt service routine 1106 to handle the interrupt.

In addition, the vector 1118 is provided to the shadow set mapping logic 1122 to determine whether a shadow set 1126 is to be used by the interrupt routine 1106, and if so, which one. In this instance, the interrupt vector 1118 is a Level 2 interrupt, and therefore the shadow set mapping logic 1122 selects the contents of EVL2 (within the SRSLo register 325) to be provided to the CSS register 1121. When the contents of the CSS register 1121 are filled with the contents of the EVL2 field, the previous contents of the CSS register 1121 are pushed into the PSS register 1123. Architecturally, the value in the CSS field 1121 selects which of the shadow sets 1126 will be used for the next instruction to be executed. In this illustration, the field EVL2 contains a value corresponding to shadow set "1" of the shadow sets 1126. Thus, when the first instruction of the interrupt service routine 1106 executes, rather than using the GPR 1124, it will instead use set "1" of the shadow set 1126.

At this point it should be clear that the contents of GPR 1124 remain in the same state that they were in when the microprocessor 310 was interrupted. However, since the interrupt routine 1106 will use set "1" of the shadow set 1126, there is no need to save the contents of the GPR 1124 before the service routine 1106 is allowed to execute, because the service routine 1106 will not overwrite any of the contents of the GPR 1124. Rather, references by the service routine 1106 to registers within the GPR 1124 will utilize the duplicate registers within set "1" of the shadow set 1126.

When the interrupt service routine 1106 completes (with an eret instruction), hardware within the processor 310 causes the contents of the PSS register 1123 to be popped (or restored) back into the CSS register 1121. In addition, execution returns to the normal instructions 1104. Thus, if the GPR 1124 was the current register set before the interrupt occurred, the instructions 1104 will continue execution using the GPR 1124. One skilled in the art will appreciate that since the contents of the GPR 1124 were not overwritten by the service routine 1106, there is no need for the routine 1106 to restore the contents of the GPR 1124 before ending.

Although not shown, it should be appreciated that while executing the interrupt service routine 1106, it is possible for the microprocessor 310 to receive a second interrupt. Depending on the priority level of the second interrupt, it may or may not be allowed to proceed. If it is allowed to proceed, the shadow set mapping logic 1122 will select the predefined shadow set 1126 for the new interrupt, and execution will continue with the new shadow set, as described above. That is, if nested interrupts are enabled, it will be up to the exception software to save away, and later restore the contents of the CSS 321 and PSS 323 registers.

Figure 12:
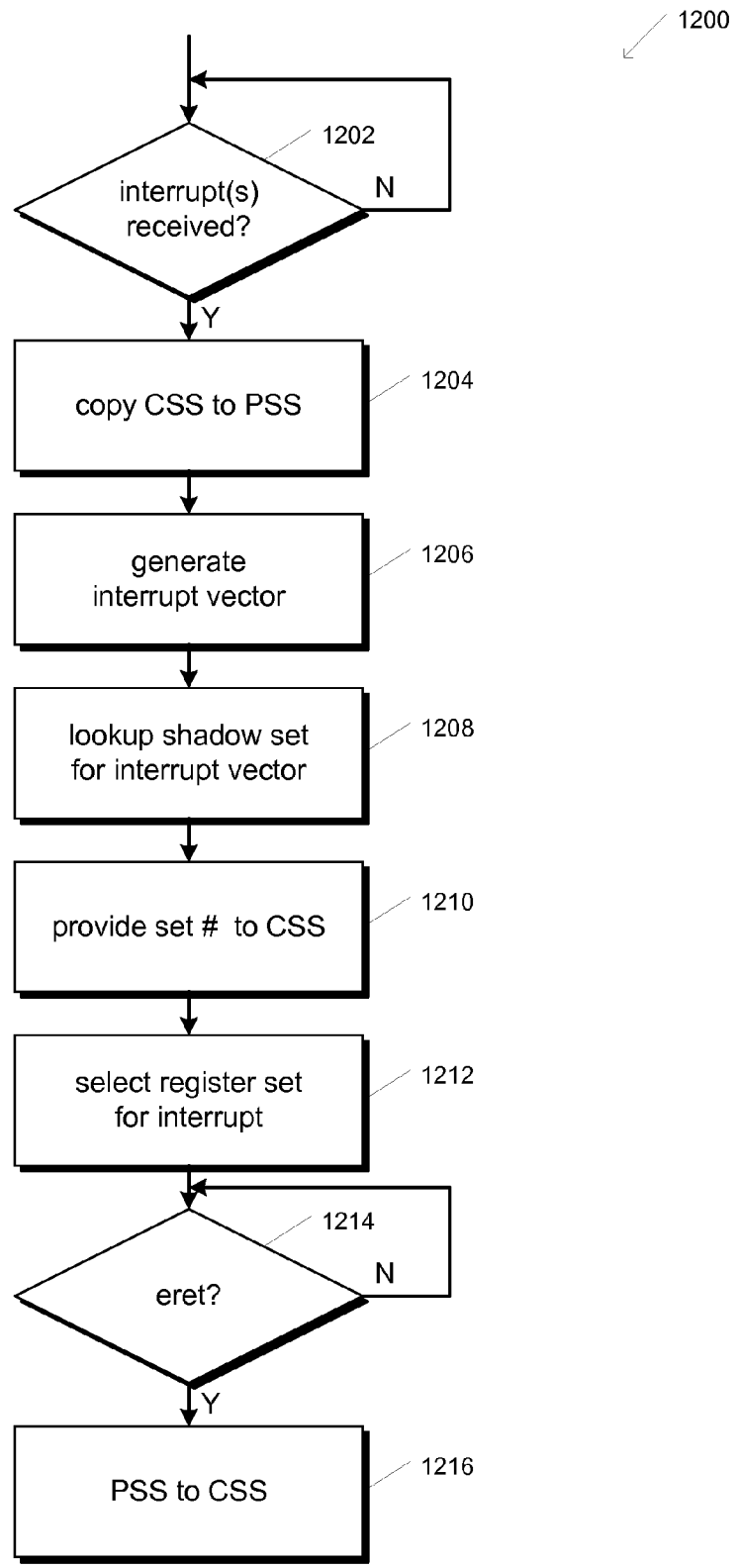
FIG. 12 is a flow chart illustrating the method of selecting a shadow register set, according to the present invention.

Referring now to FIG. 12, a flow chart 1200 is provided to illustrate the method of the present invention. Flow begins at decision block 1202 where the microprocessor is executing instructions, and is awaiting an interrupt. When an interrupt is received (and the interrupt that is received is enabled), flow proceeds to block 1204.

At block 1204, the contents of the CSS register (321) 1121 are copied into the PSS register (323) 1123. Flow then proceeds to block 1206.

At block 1206, the vector generator 316 generates an interrupt vector corresponding to the received interrupt. Flow then proceeds to block 1208.

At block 1208, the shadow set mapping logic (322) 1122 selects a predefined shadow set corresponding to the interrupt vector generated in block 1206. Flow then proceeds to block 1210.

At block 1210, the number of the selected shadow set is provided to the CSS register (321) 1121. Flow then proceeds to block 1212.

At block 1212, the new contents of the CSS register (321) 1121 cause the microprocessor 310 to begin using the shadow set (326) 1126 defined in the CSS register (321) 1121. Flow then proceeds to decision block 1214.

At decision block 1214 a determination is made as to whether an end of the interrupt service routine (eret) has occurred. If not, flow remains at decision block 1214 until an eret occurs. When an eret occurs, flow proceeds to block 1216.

At block 1216, the contents of the PSS register (323) 1123 are popped (or restored) back into the CSS register (321) 1121 thereby causing the microprocessor 310 to begin using the register set defined by the current contents of the CSS register (321) 1121. In addition, program flow returns to program execution at the point of interruption.

What should be clear from the above is that the present invention has provided a method and apparatus for programmably mapping shadow register sets to particular interrupts within a processing system. The invention eliminates the need for storing away the contents of the general purpose registers prior to handling an interrupt, thereby improving the efficiency of interrupts, and improving the reaction time to the interrupts. The invention has been described by utilizing logic that programmably maps information relating to received interrupts (such as the interrupt vector) to pre-defined shadow sets, and using the shadow sets during execution of interrupt service routines, exception routines, or even other routines that are tied to a particular processing mode of the microprocessor (e.g., kernel mode, exception mode, etc.).

One skilled in the art will appreciate that a programmer may occasionally wish to utilize the contents of another register set, whether GPR 1124 or another shadow set 1126, when executing his program. That is, if the current set defined in the CSS register 1121 is shadow set "1", the executing program may desire to retrieve the contents of a register within the GPR 1124 (referenced in the PSS register 1123). Therefore, the inventor of the present invention has provided two instructions that allow such access.

Referring now to FIG. 13, a description 1300 is provided for an instruction "RDSGPR" that instructs the microprocessor to move the contents of a register in any one of the shadow sets 1126, or the GPR 1124 into the current register set. For example, an instruction of the form: RDSGPR rt, +2(rd) would cause the microprocessor to select the shadow set that is "2" greater than the current register set, and place the contents of the register defined by the operand rd within that register set, into the register defined by the operand rt within the current register set.

Referring now to FIG. 14, a description 1400 is provided for an instruction "WRSGPR" that instructs the microprocessor to move the contents of a register in the current register set to a register in any one of the shadow sets 1126, or the GPR 1124. Syntax related to this discussion is similar to the above, and described in 1400.

What has been described above is a method and apparatus for improving the performance of high priority interrupts by eliminating the need to store away the contents of the general purpose register file prior to executing an exception routine. The invention accomplishes this task by providing shadow register sets that duplicate the registers in the GPR, and programmably mapping these register sets to interrupts. In one embodiment, the mapping of the interrupts occurs using the exception vector corresponding to the interrupt. However, one skilled in the art should appreciate that other information relating to a received interrupt may be used to establish the correlation between the interrupt, and the shadow set to be used. Examples include the priority level of the interrupt, the fields associated with the interrupt to indicate to the processor which interrupt occurred (e.g., the cause register), the mask fields corresponding to the interrupt, etc. The present invention should therefore not be limited to the type of correlation used.

Furthermore, the mechanism described that stores the correlation between the interrupt and a shadow register set are status registers within the microprocessor. These registers have been described as registers that are readable, and programmable by kernel mode software. However, one skilled in the art should appreciate that other mechanisms may be used to define and store the correlation.

In addition, the present invention has provided two registers, CSS and PSS to store an index to the current shadow set, and the previous shadow set, and interconnected these registers to the available register sets so that one may be selected based on the contents of CSS. One skilled in the art will appreciate that other mechanisms could be used to index a desired shadow set, and to store previously used shadow sets. For example, rather than using two registers, a FIFO, or a stack could be used to store the index information provided by the shadow set mapping logic.

Finally, the embodiment described above has allowed up to sixteen register sets, including fifteen shadow sets, to be used for a number of different interrupt priority levels. The inventor believes that the number of shadow register sets provided should correspond to the needs of the system designer, and should not be limited to fifteen, either as a minimum or a maximum.

Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core that is embodied in program code and may be transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A processing system comprising at least two general purpose register sets, wherein in response to execution of an instruction that identifies a first register in a first register set of the register sets and a second register in a second register of the register sets, wherein the first register set comprises a shadow register set, data is transferred between the first register and the second register.

2. The processing system as recited in claim 1, wherein the second register set is a shadow register set.

3. The processing system as recited in claim 1, wherein the second register set is not a shadow register set.

4. The processing system as recited in claim 1, wherein the second register set is identified by the contents of a current shadow set register.

5. The processing system as recited in claim 1, wherein the instruction includes a first operand identifying which register of the first register set is the first register.

6. The processing system as recited in claim 2, wherein the instruction includes a second operand identifying which register of the second register set is the second register.

7. The processing system as recited in claim 2, wherein the instruction includes a third operand identifying the first register set.

8. The processing system as recited in claim 4, wherein said instruction comprises a third operand which identifies the first register set relative to the second register set.

9. The processing system as recited in claim 3, wherein said shadow register set duplicates at least a portion of the second register set.

10. The processing system as recited in claim 3, wherein said shadow register set is one of a plurality of shadow register sets, and wherein each of said plurality of shadow register sets duplicates at least a portion of said second register set.

11. A method for transferring data between registers of at least two general purpose register sets, the method comprising:
    executing an instruction that identifies a first register of a first register set of said register sets and a second register of a second register set of said register sets, wherein the first register set comprises a shadow register set; and
    transferring data between the first register and the second register of, in response to execution of the instruction.

12. The method as recited in claim 11, wherein the second register set is a shadow register set.

13. The method as recited in claim 11, wherein the second register set is not a shadow register set.

14. The method as recited in claim 11, wherein the second register set is identified by the contents of a current shadow set register.

15. The method as recited in claim 11, wherein the instruction includes a first operand identifying which register of the first register set is the first register.

16. The method as recited in claim 12, wherein the instruction includes a second operand identifying which register of the second register set is the second register.

17. The method as recited in claim 12, wherein the instruction includes a third operand identifying the first register set.

18. The method as recited in claim 14, wherein said instruction comprises a third operand which identifies the first register set relative to the second register set.

19. The method as recited in claim 13, wherein said shadow register set duplicates at least a portion of the second register set.

20. The method as recited in claim 13, wherein said shadow register set is one of a plurality of shadow register sets, and wherein each of said plurality of shadow register sets duplicates at least a portion of said second register set.

21. A computer readable storage medium containing instructions which when executed are operable to:
    execute an instruction that identifies a first register of a first register set of a set of registers and a second register of a second register set of the set of registers, wherein the first register set comprises a shadow register set; and
    transfer data between the first register and the second register, in response to execution of the instruction.

22. The computer readable storage medium as recited in claim 21, wherein the second register set is a shadow register set.

23. The computer readable storage medium as recited in claim 21, wherein the second register set is not a shadow register set.

24. The computer readable storage medium as recited in claim 21, wherein the second register set is identified by the contents of a current shadow set register.

25. The computer readable storage medium as recited in claim 21, wherein the instruction includes a first operand identifying which register of the first register set is the first register.

26. The computer readable storage medium as recited in claim 22, wherein the instruction includes a second operand identifying which register of the second register set is the second register.

27. The computer readable storage medium as recited in claim 22, wherein the instruction includes a third operand identifying the first register set.

28. The computer readable storage medium as recited in claim 24, wherein said instruction comprises a third operand which identifies the first register set relative to the second register set.

29. The computer readable storage medium as recited in claim 23, wherein said shadow register set duplicates at least a portion of the second register set.

30. The computer readable storage medium as recited in claim 23, wherein said shadow register set is one of a plurality of shadow register sets, and wherein each of said plurality of shadow register sets duplicates at least a portion of said second register set.

* * * * *

UNITED STATES PATENT AND TRADEMARK OFFICE
CERTIFICATE OF CORRECTION

PATENT NO. : 7,487,332 B2 Page 1 of 1
APPLICATION NO. : 11/668582
DATED : February 3, 2009
INVENTOR(S) : G. Michael Uhler It is certified that error appears in the above-identified patent and that said Letters Patent is hereby corrected as shown below:

On the Title Page, Section 75,
Please replace "Michael G. Uhler" with --G. Michael Uhler--

In the Claims, Claim 11, Column 11,
Line 47, please replace "register of, in" with --register, in--

Signed and Sealed this

Second Day of June, 2009

JOHN DOLL
*Acting Director of the United States Patent and Trademark Office*